United States Patent [19]
Scherenberg

[11] 3,776,355
[45] Dec. 4, 1973

[54] INSTALLATION FOR THE PREVENTION OF SLIPPING OF THE DRIVE WHEEL OF MOTOR VEHICLES

[75] Inventor: Hans O. Scherenberg, Stuttgart-Heumaden, Germany

[73] Assignee: Daimler-Benz Aktiengesellschaft, Stuttgart-Unterturkheim, Germany

[22] Filed: Mar. 25, 1969

[21] Appl. No.: 810,160

[30] Foreign Application Priority Data
Mar. 25, 1968 Austria ............................... 2931/68

[52] U.S. Cl. ......... 180/77 R, 180/82 R, 180/105 R, 192/3 R, 303/21 CG
[51] Int. Cl. .......................... B60t 8/12, B60k 31/00
[58] Field of Search ................ 180/77, 105, 105 E, 180/1, 82; 303/21 BB, 21 AA; 192/3

[56] References Cited
UNITED STATES PATENTS

| 2,304,560 | 12/1942 | Freeman ................. 303/21 BB UX |
| 2,401,628 | 6/1946 | Eksergian .................. 303/21 BB X |
| 2,762,235 | 9/1956 | Olson et al. .................... 180/77 UX |
| 3,025,722 | 3/1962 | Eger, Jr. et al. ................. 180/1 UX |
| 3,060,602 | 10/1962 | Buttenhoff ....................... 180/77 X |
| 3,217,826 | 11/1965 | Carter et al. ......................... 180/77 |
| 3,288,232 | 11/1966 | Shepherd .............................. 180/1 |

Primary Examiner—Kenneth H. Betts
Attorney—Craig, Antonelli, and Hill

[57] ABSTRACT

An installation for preventing slippage of the driving wheels of motor vehicles whose driving wheels are driven from the driving engine by way of a transmission, and in which a pulse transmitter responsive to an increase in the rotational acceleration is coordinated to the drive connection between the engine and the driving wheels which is so connected with a correcting member that upon exceeding a predetermined limit of rotational acceleration, the output of the engine is automatically reduced.

19 Claims, 1 Drawing Figure

PATENTED DEC 4 1973
3,776,355
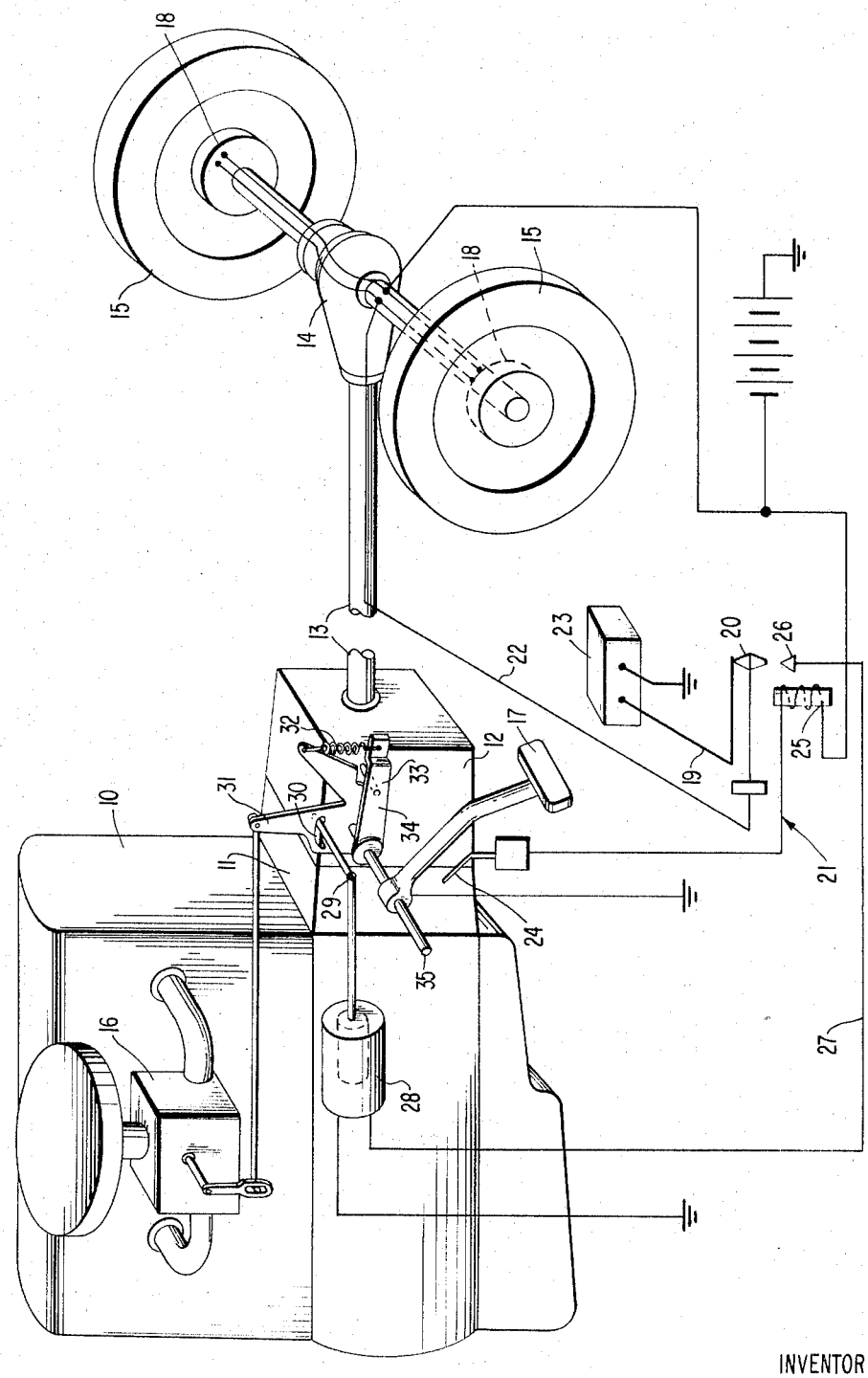
INVENTOR
HANS O. SCHERENBERG
BY Krug, Antonelli, Stewart & Hill
ATTORNEYS

INSTALLATION FOR THE PREVENTION OF SLIPPING OF THE DRIVE WHEEL OF MOTOR VEHICLES

The present invention relates to an installation for the prevention of the slipping of the driven wheels of motor vehicles whose driven wheels are driven from a driving internal combustion engine by way of a transmission, especially by way of an automatically shifting change-speed transmission, which engine is adapted to be regulated in its output by a regulating or control member, for example, by a carburetor throttle valve which is to be actuated by an actuating member, for instance, a drive pedal.

In motor vehicles with an internal combustion engine having a high torque, the driven wheels occasionally tend to slip. This slipping may occur, for example, when the actuation of the drive pedal or of the clutch is not realized as carefully as would be required by the high-torque engine. This same effect, by the way, can also occur during the drive if the vehicle, for example, during the acceleration reaches from one road-surface to another, for example, a more slippery road surface. In all cases not only a loss of drive in propulsion is connected with this slipping, i.e., the acceleration is lost but also the vehicle may begin to skid as a result thereof because of the absence of the lateral guide force.

The present invention now aims at avoiding the described disadvantages. The underlying problems are solved by the present invention in that a pulse transmitter is coordinated to the drive connection between the transmission and the driving wheels responsive to rotational or angular acceleration, which is connected with a correcting member, that, in its turn, is in operative connection with the linkage between the actuating member and the regulating or control member and which with a pulse initiation upon exceeding a possibly adjustable acceleration, engages into this linkage in the sense of an output reduction.

By means of the installation according to the present invention the rotational acceleration at the driving wheels is automatically sensed and upon exceeding the permissive value, i.e., upon slippage of the wheels the driving engine is immediately throttled by engagement in the control linkage. The aforementioned disadvantages are avoided in this manner. The engagement takes place automatically and independently of the driver, which contributes to a further relief of the driver's responsibilities.

For example, the Cardan shaft can be used for the installation or mounting of the pulse transmitter. On the other hand, it would also be feasible within the scope of the present invention, to install the pulse transmitter directly into the wheel hub whereby, however, appropriately one pulse transmitter is coordinated to each wheel, which then act by way of a common circuit of any conventional construction, on the correcting member in such a manner that the respective maximum rotational acceleration is made effective. The engagement of the correcting member may be realized in a conventional black-white manner such that upon pulse initiation, the regulator is retracted or taken back at the internal combustion engine into its zero position. On the other hand, it is also within the purview of the present invention to differentiate the engagement, for example, by way of an electronic intermediate circuit-connection, in the sense that the regulating member is the more returned to its zero position the higher the amount, by which the rotational acceleration exceeds the adjusted or preselected value.

Installations have already been proposed in the prior art, in which the brake slippage is regulated in dependence on a pulse transmitter responding to rotational or angular acceleration. For the purpose of combining such an installation with the installation according to the present invention, it is now additionally proposed that the line from the pulse transmitter is extended to a shifting relay or a switch and is adapted to be selectively connected by means of this switch with the correcting member or with the brake slippage regulator. In this manner the advantage is achieved that both the brake slippage regulator as also the acceleration monitor can be controlled by means of one pulse transmitter.

In one embodiment of the installation according to the present invention a shifting switch, possibly adapted to be actuated indirectly, is coordinated to the actuating member, for example, to the drive pedal, which upon actuation of the actuating member switches the pulse transmitter from the brake slippage regulator to the correcting member. In contrast thereto, in another embodiment of this type a possibly indirectly actuated shifting switch is coordinated to the brake pedal which switches the pulse transmitter upon actuation of the brake pedal from the correcting member to the brake slippage regulator. The shifting or switching can thereby take place, of course, either directly or indirectly, for example, by way of a relay. Similarly, the shifting of the correcting member can take place indirectly, for example, also by way of the interconnection of relays and/or with the aid of servo-members.

According to a further feature and development of the inventive concept it is proposed that a lifting magnet or solenoid serves as correcting member which engages in the first linkage part operatively connected with the regulating member that, in its turn, is force-lockingly connected with the second linkage part leading to the actuating member. It is then appropriate for that purpose if the two linkage parts are kept in continuous abutment at one another by a draw-spring and the armature of the lift magnet engages by means of a pin in an elongated aperture in the first linkage part.

Accordingly, it is an object of the present invention to provide an installation for preventing the slippage of the driven wheels of motor vehicles which avoids by simple means the aforementioned shortcomings and drawbacks encountered in the prior art.

Another object of the present invention resides in an installation for preventing slippage of the driving wheels of motor vehicles which is simple in construction yet reliable in operation.

A still further object of the present invention resides in an installation for the prevention of the slippage of the driving wheels of motor vehicles, which can be readily combined with an installation for preventing brake slippage.

These and further objects, features and advantages of the present invention will become more obvious from the following description when taken in connection with the accompanying drawing which shows, for purposes of illustration only, one embodiment in accordance with the present invention and wherein:

The single FIGURE is a somewhat schematic, perspective view of one embodiment of an installation in accordance with the present invention for preventing the slipping of the driving wheels of motor vehicles.

Referring now to the single FIGURE of the drawing, the driving engine 10 drives by way of a clutch 11 and a transmission 12 the Cardan shaft 13 which, in its turn, drives the rear wheels 15 of the motor vehicle by way of a differential gear 14. The clutch 11 and the transmission 12 may also be constructed as automatically shifting change-speed gear, for example, with a hydrodynamic coupling or a hydrodynamic torque converter. The control of the engine 10 takes place by a carburetor 16 whose throttle valve (not shown) is actuated by the drive or gas pedal 17 in a manner to be described more fully hereinafter. With injection-type engines, of course, an injection pump takes the place of the carburetor 16. However, nothing changes in the principle of the present invention by such substitution.

Rotational-acceleration pulse transmitters 18 are installed into the two rear wheels 15 into the hub portions thereof. These rotational-acceleration pulse transmitters 18, which are of conventional construction, produce in a known manner not forming part of the present invention, an electric pulse upon surpassing or exceeding a predetermined rotational acceleration. The response value of these pulse transmitters may be adjusted in a known manner to a predetermined rotational acceleration. This pulse is supplied by way of the line 22 to the center contact 20 of a shifting switch generally designated by reference numeral 21 and from the latter, in the illustrated position, by a line 19 to the brake slippage regulator mechanism 23 which again is of known construction. The brake regulator apparatus 23 regulates in a conventional manner the brake slippage, if the brake is engaged or actuated with a non-actuated drive pedal 17. The installation of the present invention therefore is inoperative with non-actuated drive pedal 17.

Upon actuation of the drive pedal 17, i.e., during acceleration, the switch 24 is closed and the energizing winding 25 of the shifting switch 21 is energized. As a result thereof, the center contact 20 is shifted or switched to the other terminal 26 and as a result thereof, the line 22 is connected with line 27 that leads to a lift magnet or solenoid 28. The armature of the solenoid 28 engages with a pin 29 into the elongated aperture 30 of the first linkage part 31 which is in operative connection with the throttle valve of the carburetor 16. The first linkage part 31 is retained by a draw-spring 32 in constant abutment at the pin 33 of the second linkage part 34 which is secured on the shaft 35 of the pedal 17.

If in this position, i.e., upon actuation of the drive pedal 17, a pulse is transmitted in the pulse transmitters 18, then this pulse is transmitted by way of lines 19, 20, 26 and 27 to the magnet 28 and the latter attracts. As a result thereof, it pulls the first linkage part 31 by means of the pin 29 against the effect of the draw-spring 32 in the closing direction. This means that the throttle valve is then closed and the output of the internal combustion engine decreases. This goes on until both rear wheels 15 again grip and the pulse changes. The lift magnet or solenoid 28 then becomes again de-energized and the draw-spring 32 then again pulls the two linkage parts 31 and 34 back into their mutual abutment. The internal combustion engine can then be controlled again in its output in the usual manner from the drive pedal 17.

While I have shown and described only one embodiment in accordance with the present invention it is understood that the same is not limited thereto but is susceptible of numerous changes and modifications as known to a person skilled in the art, and I therefore do not wish to be limited to the details shown and described herein but intend to cover all such changes as are within the scope of those skilled in the art.

I claim:

1. An installation for the prevention of the slipping of the driving wheels of motor vehicles, whose driving wheels are driven from an internal combustion engine by way of a transmission, the engine being adapted to be controlled in its output by a regulating means adapted to be actuated by an actuating means, characterized by pulse transmitter means responsive to rotational acceleration and operatively associated with the drive connection between the transmission and the driving wheels, said pulse transmitter means being operatively connected with a correcting means, and linkage means between said actuating means and said regulating means, said correcting means being operatively connected with said linkage means in such a manner that upon pulse initiation, when exceeding a predetermined acceleration, the correcting means engages into said linkage means in the sense of a reduction of the output of the engine.

2. An installation according to claim 1, wherein said transmission is an automatically shifting transmission.

3. An installation according to claim 1, wherein said regulating means is a carburetor throttle valve.

4. An installation according to claim 3, wherein said actuating means is a drive pedal.

5. An installation according to claim 1, wherein said actuating means is a drive pedal.

6. An installation according to claim 1, wherein said correcting means includes a solenoid means which engages into a first linkage part of said linkage means operatively connected with the regulating means, said first linkage means being force-lockingly connected with a second linkage part of said linkage means leading to the actuating means.

7. An installation for the prevention of the slipping of the driving wheels of motor vehicles, whose driving wheels are driven for an internal combustion engine by way of a transmission, the engine being adapted to be controlled in its output by a regulating means adapted to be actuated by an actuating means, characterized by pulse transmitter means responsive to rotational acceleration and operatively associated with the drive connection between the transmission and the driving wheels, said pulse transmitter means being operatively connected with a correcting means, and linkage means between said actuating means and said regulating means, said correcting means being operatively connected with said linkage means in such a manner that upon pulse initiation, when exceeding a predetermined acceleration, the correcting means engages into said linkage means in the sense of a reduction of the output of the engine, brake slippage regulator means for controlling the brake slippage in dependence on the pulse transmitter means, the line from the pulse transmitter means being extended to a switch means operable to selectively connect said line with said correcting means or with the brake slippage regulator means.

8. An installation according to claim 7, wherein the switch means is coordinated to the actuating means and is operable to switch the pulse transmitter means, upon actuation of the actuating means, from the brake slippage regulator means to the correcting means.

9. An installation according to claim 7, wherein the switch means is coordinated to a brake pedal and is operable to switch the pulse transmitter means, upon actuation of the brake pedal, from the correcting means to the brake slippage regulator means.

10. An installation according to claim 8, wherein means are provided for indirectly-actuating said switch means.

11. An installation according to claim 9, wherein means are provided for indirectly actuating said switch means.

12. An installation for the prevention of the slipping of the driving wheels of motor vehicles, whose driving wheels are driven from an internal combustion engine by way of a transmission, the engine being adapted to be controlled in its output by a regulating means adapted to be actuated by an actuating means, characterized by pulse transmitter means responsive to rotational acceleration and operatively associated with the drive connection between the transmission and the driving wheels, said pulse transmitter means being operatively connected with a correcting means, and linkage means between said actuating means and said regulating means, said correcting means being operatively connected with said linkage means in such a manner that upon pulse initiation, when exceeding a predetermined acceleration, the correcting means engages into said linkage means in the sense of a reduction of the output of the engine, said correcting means including a solenoid means which engages into a first linkage part of said linkage means operatively connected with the regulating means, said first linkage means being forcelockingly connected with a second linkage part of said linkage means leading to the actuating means and both linkage parts being kept in continuous abutment against one another by spring means, the armature of the solenoid means engaging by means of a pin into an elongated aperture in the first linkage part.

13. An installation according to claim 12, with brake slippage regulator means for controlling the brake slippage in dependence on the pulse transmitter means, characterized in that the line from the pulse transmitter means is extended to a switch means operable to selectively connect said line with said correcting means or with the brake slippage regulator means.

14. An installation according to claim 13, wherein the switch means is coordinated to the actuating means and is operable to switch the pulse transmitter means, upon actuation of the actuating means, from the brake slippage regulator means to the correcting means.

15. An installation according to claim 13, wherein the switch means is coordinated to a brake pedal and is operable to switch the pulse transmitter means, upon actuation of the brake pedal, from the correcting means to the brake slippage regulator means.

16. An installation for the slippage-prevention of the driven wheels of motor vehicles, whose driving engine is adapted to be controlled in its output by a control means characterized by pulse transmitter means responsive to rotational acceleration of the driven wheels, correcting means, and connecting means operatively connecting the pulse transmitter means with said correcting means in a manner that in case of a pulse initiation, upon exceeding a predetermined acceleration, the correcting means is operable to adjust the engine output control means in the sense of a reduction of the engine output.

17. An installation for the slippage-prevention of the driven wheels of motor vehicles, whose driving engine is adapted to be controlled in its output by a control means characterized by pulse transmitter means responsive to rotational acceleration of the driven wheels, correcting means, and connecting means operatively connecting the pulse transmitter means with said correcting means in such a manner that in case of a pulse initiation, upon exceeding a predetermined acceleration, the correcting means is operable to adjust the engine output control means in the sense of a reduction of the engine output, brake-slippage control means for controlling the brake slippage in dependence on the pulse transmitter means, and shifting means in said connecting means and operable to selectively connect said transmitter means with said correcting means or with the brake slippage control means.

18. An installation according to claim 17, wherein said shifting means switches the pulse transmitter means from the brake slippage control means to the correcting means upon actuation of the engine.

19. An installation according to claim 17, wherein said shifting switches the pulse transmitter means from the correcting means to the brake slippage control means upon actuation of the brake.

* * * * *